United States Patent [19]

Okamoto et al.

[11] Patent Number: 5,612,105
[45] Date of Patent: Mar. 18, 1997

[54] BIAXILLY ORIENTED POLYAMIDE FILM AND ITS PRODUCTION PROCESS

[75] Inventors: Takashi Okamoto; Minoru Kishida; Masanobu Hioki; Atsuhiro Ishikawa; Toshikazu Kawakita, all of Kyoto, Japan

[73] Assignee: Unitika Ltd., Hyogo, Japan

[21] Appl. No.: 461,734

[22] Filed: Jun. 5, 1995

[30] Foreign Application Priority Data

Jun. 3, 1994 [JP] Japan .................................... 6-145383
Mar. 16, 1995 [JP] Japan .................................... 7-057458

[51] Int. Cl.$^6$ ............................ B29C 47/06; B32B 27/34
[52] U.S. Cl. .................. 428/34.8; 264/210.6; 264/210.7; 264/290.2; 426/127; 428/35.2; 428/458; 428/475.2; 428/475.5; 428/910
[58] Field of Search .......................... 264/210.7, 290.2, 264/210.6; 428/34.8, 35.2, 474.7, 458, 910, 475.2, 475.5; 525/432; 426/127

[56] References Cited

U.S. PATENT DOCUMENTS

| | | | |
|---|---|---|---|
| 3,449,299 | 6/1969 | Schneider et al. | 264/176.1 |
| 4,120,928 | 10/1978 | Furukawa et al. | 264/210.7 |
| 4,532,100 | 7/1985 | Lancaster et al. | 264/564 |
| 4,767,651 | 8/1988 | Starczewski et al. | 426/127 |
| 4,963,426 | 10/1990 | Nishimoto et al. | 428/213 |
| 5,126,211 | 6/1992 | Mizutani et al. | 264/235.8 |
| 5,206,309 | 4/1993 | Altman | 525/432 |
| 5,480,690 | 1/1996 | Stenger et al. | 428/34.8 |

FOREIGN PATENT DOCUMENTS

| | | |
|---|---|---|
| 0331509 | 9/1989 | European Pat. Off. . |
| 0573306 | 12/1993 | European Pat. Off. . |
| 4-47924 | 2/1992 | Japan .................. 264/290.2 |
| 6-99490 | 4/1994 | Japan .................. 264/210.7 |
| 6-99486 | 4/1994 | Japan .................. 264/210.7 |
| 6-99489 | 4/1994 | Japan .................. 264/210.7 |
| 6-99488 | 4/1994 | Japan .................. 264/210.7 |
| WO9215641 | 9/1992 | WIPO . |

*Primary Examiner*—Jeffery R. Thurlow
*Attorney, Agent, or Firm*—Sughrue, Mion, Zinn, Macpeak & Seas

[57] ABSTRACT

A biaxially oriented polyamide film which has not only excellent bending pinhole resistance and excellent dimensional stability but also excellent tear linearity in the longitudinal direction of the film. More specifically, the invention provides a biaxially oriented polyamide film having a tear linearity in the longitudinal direction of the film, which includes as a main material nylon 6 and an aliphatic polyamide resin mixed in a weight ratio of from 75:25 to 99:1, wherein the difference in surface tension (dyne/cm) between the nylon 6 and the polyamide other than nylon 6 satisfies the following relationship (1)

$$3.0 \leq \gamma_A - \gamma_B \leq 15.0 \tag{1}$$

wherein $\gamma_A$ is a surface tension of N6 and $\gamma_B$ is a surface tension of PA.

17 Claims, 2 Drawing Sheets

BIAXILLY ORIENTED POLYAMIDE FILM AND ITS PRODUCTION PROCESS

FIELD OF THE INVENTION

This invention relates to a biaxially oriented polyamide film. The film comprises as a main material a mixture comprising nylon 6 (hereinafter, referred to as "N6") and an other aliphatic polyamide resin (hereinafter, referred to as "PA"), has excellent longitudinal direction tear linearity, excellent mechanical strength, heat resistance, oil resistance, solvent resistance and dimensional stability and is useful as a packaging material for food, pharmaceutical compositions, sundry goods and the like.

BACKGROUND OF THE INVENTION

Various types of synthetic resin film packing bags are widely used for the packaging of food, pharmaceutical compositions, sundry goods and the like. They are produced mostly by laminating a biaxially oriented synthetic resin film and a heat-sealable non-oriented film in two or more layers. Especially, biaxially oriented high strength polyamide films produced by means of flat simultaneous biaxial drawing, flat serial biaxial drawing, tubular method and the like are used as the biaxially oriented films in the field where durability, heat resistance, oil resistance, solvent resistance, mechanical strength and the like are required.

Since these packing bags in which biaxially oriented polyamide films are used have a problem of poor unsealability by tearing, they are sometimes equipped with notches as a means to improve their unsealability. However, when these bags are torn from the notch, frequently they cannot be torn in a lengthwise or crosswise direction easily or linearly. In such a case, unsealing occurs along a distorted line and excess force is required due to forced tearing, so that not only are the contents scattered and wasted but also accidents such as soiling of clothes occur when the contents are liquids. In order to resolve such problems, a method is employed in which a bag having reduced sealing strength is produced by laminating a biaxially oriented polyamide film and a heat-sealable non-oriented film, and the bag is unsealed by tearing it from the part sealing the bag. However, this method still requires further improvement, because, in some cases, unsealing of the bag is not easy and its contents scatter from the sealing part during transfer handling of the sealed bag.

Laminated products in which a uniaxially oriented polyolefin film is used as an intermediate layer, such as a three layer laminated film of biaxially oriented polyamide film/uniaxially oriented polyolefin film/non-oriented polyolefin film, are known as easily unsealable materials which show excellent tear linearity when films are torn. In this case, tear linearity in the drawn direction of the uniaxially oriented film is improved, but it is necessary to construct a multilayer structure by newly inserting an intermediate layer for the purpose of merely improving the tear linearity, thus resulting in high cost, limited use and like problems.

With regard to easily tearable films, a biaxially oriented film of mixed polyamide prepared by mixing N6 with 15 to 60% by weight of MXD6 (polymetaxylylene adipamide) and laminated films thereof have been proposed in JP-A-5-220837 and JP-A-5-200958 (the term "JP-A" as used herein means an "unexamined published Japanese patent application").

However, such MXD6-mixed films have a problem in terms of pinhole resistance, particularly frequent generation of pinholes due to bending fatigue.

SUMMARY OF THE INVENTION

In view of the above, it therefore is an object of the present invention to provide a biaxially oriented polyamide film which has excellent durability, heat resistance, oil resistance, solvent resistance and mechanical strength, has practically useful dimensional stability as a packaging material for food and the like under dry or wet heating conditions and is useful as an easily unsealable packaging material with tear linearity in the longitudinal direction of the film.

With the aim of solving the aforementioned problems involved in the prior art, the inventors of the present invention have conducted intensive studies and accomplished the present invention as the result.

Accordingly, the present invention comprises a biaxially oriented polyamide film having tear linearity in the longitudinal direction of the film, which comprises as a main material nylon 6 (N6) and an aliphatic polyamide resin (PA) in a weight ratio of from 75:25 to 99:1, wherein the difference in surface tension (dyne/cm) between N6 and PA satisfies the following formula (1)

$$3.0 \leq \gamma_A - \gamma_B \leq 15.0 \tag{1}$$

wherein $\gamma_A$ is the surface tension of N6 and $\gamma_B$ is the surface tension of PA.

Other objects and advantages of the present invention will become apparent as the description below progresses.

Figure 1:
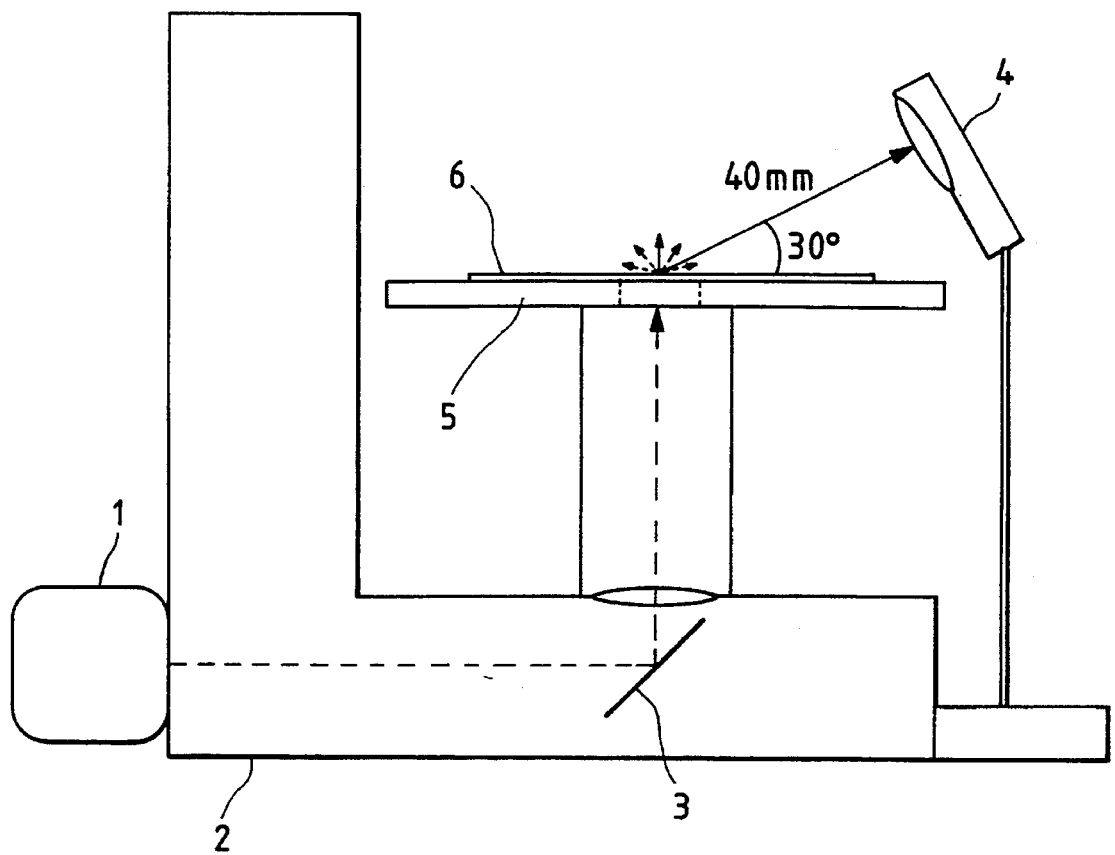
FIG. 1 is a drawing showing an apparatus for use in the measurement of illuminance anisotropy ratio of transmitted scattered light (IAR).

In these drawings, 1 is a light source, 2 is a light microscope from which the lens-barrel is detached, 3 is a mirror, 4 is an illuminance meter, 5 is a stage, 6 is an undrawn sheet and 7 is a notch.

DETAILED DESCRIPTION OF THE INVENTION

The N6 which can be used in the present invention includes not only N6 homopolymer but also copolymers containing 90 mol % or more of N6.

Examples of the PA which can be used in the present invention include those which contain 90 mol % or more of nylon 7, nylon 8, nylon 9, nylon 10, nylon 11, nylon 12, nylon 69, nylon 610, nylon 612 and the like. These compounds may be used alone, as a blend of two or more or in the form of a copolymer with N6. In the case of such a copolymer, the copolymerization molar ratio of N6 and the other nylon polymer may be in the range of preferably from 20:80 to 80:20.

Of these, particularly preferred examples include nylon 11, nylon 12, nylon 69, nylon 610, nylon 612, nylon 6/11 (copolymer of nylon 6 and nylon 11) and nylon 6/12 (copolymer of nylon 6 and nylon 12).

According to the film of the present invention, it is necessary to use a mixture of N6 and PA mixed in a weight ratio of from 75:25 to 99:1 as a main material. The ratio of PA if smaller than 1% by weight would not generate tear linearity and if higher than 25% by weight would result in a reduction of mechanical characteristics of the film such as bending pinhole resistance and the like.

The ratio of PA may be in the range of preferably from 15 to 2% by weight, more preferably from 10 to 3% by weight.

In addition to N6 and PA, the main material may also contain aliphatic polyamides such as nylon 46, nylon 66 and the like, alicyclic polyamides, aromatic ring-containing polyamides and non-polyamide polymers such as polyethylene, polypropylene, polystyrene and the like within such a range that the effect of the present invention is not spoiled (about 30% by weight or less, preferably about 10% or less, based on the total weight of the film).

The main material may also contain various additive agents for polyamide use within such a range that the effect of the present invention is not spoiled (for example, about 10% by weight or less based on the total weight of the film). Examples of such additive agents include inorganic lubricants such as silica, calcium carbonate and the like, organic lubricants such as paraffin waxes, antioxidants such as hindered phenols and phosphorus compounds, ultraviolet light absorbents such as hindered amines, degradation inhibitors such as halogenated coppers, anti-blocking agents such as long-chain aliphatic amides, antistatic agents such as sodium alkylsulfonates, fillers, pigments and the like.

The surface tension of the polymers is used as an index of the compatibility of two or more polymers. According to the present invention, the difference in surface tension ($\Delta\gamma$) between N6 and PA should be within the range of from 3.0 to 15.0, preferably from 4.0 to 12.0, more preferably from 5.0 to 9.0.

The surface tension ($\gamma$) as used herein is a value calculated from the following formula solely based on the chemical structure of each compound;

$$\gamma = 0.0751 \frac{\Sigma \Delta E_i}{(\Sigma \Delta V_i)^{2/3} A^{1/3}}$$

wherein $\Delta E_i$ represents contribution to molar aggregation energy by interaction between respective atoms, $\Delta V_i$ represents increased van der Waals volume ($Å^3$) and A represents the number of atoms in a repeating unit.

That is, since the surface tension of N6 is 45.2, the PA to be mixed with N6 should be a polymer whose surface tension is within the range of from 30.2 to 42.2. In this case, N6 and PA have mutually appropriate compatibility, PA is dispersed in N6 in an appropriate size and tear linearity is generated. The difference in surface tension if smaller than 3.0 would not result in tear linearity since the compatibility of the polymers is too high, and if the difference is larger than 15.0, uneven thickness of the undrawn sheet after film-making would result and tear linearity would not be stable because of a poor balance between the melt tension and stress relaxation of the molecular chain.

According to the present invention, it is desirable that the melt viscosity of PA is 0.1 to 4.0 times higher, preferably 0.2 to 2.0 times higher, than that of N6. A melt viscosity ratio (to be referred to as "PR" hereinafter) if it is smaller than 0.1 results in poor tear linearity of the resulting film since the particle size of the dispersed PA is too small, and if it is larger than 4.0 would also result in poor tear linearity of the resulting film due to the size of the dispersed particles being to large.

It is desirable also for the glass transition point of the PA of the present invention to be lower than the crystallization temperature of N6 (166° C. as N6 alone) by a factor of preferably 20° C. or more, more preferably 30° C. or more.

The reason for this is that, when the glass transition point of PA is higher than the crystallization temperature of N6, PA is in the state of a glass at the time of the N6 crystallization in the film production step begins, so that control of the shape of dispersed PA particles in the drawing step becomes difficult and stable tear linearity therefore cannot be obtained.

The present inventors have used an illuminance anisotropy ratio of transmitted scattered light (to be referred to as "IAR" hereinafter) measured using an apparatus as shown in FIG. 1, as a means to observe the dispersed state of PA in N6. The IAR is a ratio of illuminance of transmitted scattered light in the longitudinal direction of a film to that in the cross direction of the film, and dispersed PA particles in the major axis direction strongly orient toward the longitudinal direction of the film as the IAR value approaches 0, while the dispersed PA particles become spherical as the IAR value approaches 1. Since the shape and state of dispersed PA particles in undrawn films is observed using IAR, measurement of this value is useful in discussing the relationship between such observation and the tear linearity of the biaxially oriented polyamide film of the present invention.

According to the present invention, a biaxially oriented polyamide film with tear linearity in the longitudinal direction of the film is obtained efficiently by a drawing step in which an undrawn sheet having an IAR value of 0.1 to 0.8 is drawn with a draw ratio of 2.5 or more in the lengthwise and crosswise directions.

The IAR value if smaller than 0.1 would entail a difficulty in stably producing the film due to extreme orientation in the longitudinal direction of the undrawn sheet, and if larger than 0.8 would not provide stable tear linearity in the longitudinal direction of the drawn film.

As the production conditions of the film of the present invention, it is important to control the temperature of the melted polymers and the period until the melted polymers extruded from a die in a sheet form are cooled by contact with a cooling drum.

The reason for this is to prevent recovery of the deformation of dispersed PA particles in the longitudinal film direction until the melted polymers contact with the cooling drum is effective so as to maintain the shape of the dispersed PA particles have a major axis in the longitudinal film direction and to obtain stable tear linearity of the resulting film in its longitudinal direction. In general, the shape of the dispersed PA particles becomes long and slender toward longitudinal direction of a film as the temperature of melted polymers decreases and the time until its contact with the cooling drum is shortened.

Accordingly, it is desirable to produce the film of the present invention by a process which comprises the steps of: extruding a mixture of N6 and PA in a weight ratio of from 75:25 to 99:1 in the shape of a sheet through a lip opening of a die, wherein the shear rate of the melted polymers is maintained at 100 to 400 sec$^1$ and the relationship between the temperature of the melted polymers (PT) extruded from the lip opening of die and the time (t) until the melted polymers reach a cooling drum is controlled under any one of the following conditions (1) to (5)

(1) $t \leq 1.2$ seconds when PT is within $240 \leq PT < 250°$ C.,
(2) $t \leq 0.9$ second when PT is within $250 \leq PT < 260°$ C.,
(3) $t \leq 0.6$ second when PT is within $260 \leq PT < 270°$ C.,
(4) $t \leq 0.3$ second when PT is within $270 \leq PT < 280°$ C., and
(5) $t \leq 0.1$ second when PT is within $280 \leq PT < 290°$ C., adjusting the water content of the resulting undrawn sheet to 1 to 6% by weight, and
drawing the sheet at a temperature of 150° to 220° C. with a draw ratio of 2.5 or more in both the lengthwise and the crosswise directions.

In general, the shape of the dispersed PA particles also becomes long and slender toward longitudinal direction of a film as the draft ratio (DR: ratio of the lip space of a die to the thickness of undrawn sheet) increases or the draw ratio in the longitudinal direction increases.

The biaxially oriented polyamide film of the present invention can be produced by employing a tubular inflation method, a tenter simultaneous biaxial drawing method or a roll and tenter serial biaxial drawing method. The following describes tenter simultaneous biaxial drawing of the film of the present invention.

A mixture of N6 and PA having a weight ratio of from 75:25 to 99:1 is placed in an extruder, melted by heating and then extruded in the shape of a sheet from a T die. Next, the soft sheet discharged from the T die is cooled by winding it around a cooling drum. The thus obtained undrawn sheet is adjusted to a water content of 1 to 6% by weight and then subjected to simultaneous biaxial drawing at a temperature of 150° to 220° C. with a draw ratio of 2.5 or more in both the lengthwise and crosswise directions. Subsequently, the biaxial orientation is fixed by treating the drawn sheet at a temperature within the range of equal to or lower than the melting point of N6 and equal to or higher than the melting point minus 40° C.

As the occasion demands, one or both sides of the biaxially oriented film thus obtained by the drawing and heat treatment are subjected to a physicochemical surface treatment such as corona discharge, coating or the like in order to give easily adhering property.

Since the film of the present invention has a tear linearity in the longitudinal film direction, in addition to its excellent toughness, practical strength and dimensional stability against heat, it is useful as an easily unsealable packaging materials for food, pharmaceutical preparations, sundry goods and the like.

When the film of the present invention is used as a packing bag, the film is used generally after laminating it with an other plastic film such as of one of polypropylene, polyethylene, an ethylene-vinyl acetate copolymer, a polyester or the like, a paper or a metal foil such as of one of aluminium or the like, in order to give heat sealing property or improve gas barrier function. In that case, the film of the present invention is used at least in one layer, and the number of laminating layers is not particularly limited provided that the laminated film has a tear linearity.

An easily unsealable packing bag can be obtained by making such a laminated film into a bag in which the longitudinal direction of the film of the present invention is arranged in the tearing direction of the bag. Since this type of packing bags have excellent tear linearity, they are useful as bags for use in the packaging of food such as soup, jam, retort pouch and the like, as well as pharmaceutical preparations, daily necessaries, toiletries and the like.

It seems that the tear linearity of the present invention is achieved, because interfacial interaction between the PA particles dispersed in the shape of islands and the matrix-constituting N6 is so small that the stress at the time of tearing concentrates to the this part.

The following examples are provided to further illustrate the present invention. It is to be understood, however, that the examples are for purpose of illustration only and are not intended to be construed as limiting the invention. Unless otherwise indicated, all parts, percentages, ratios and the like are by weight.

First, the starting-materials and measuring methods used in the Example and Comparative Examples are described in the following.
(1) Starting Materials
N6:
Nylon 6 manufactured by Unitika Ltd. under the trade name of A1030BRF.

Nylon 610 (N610)

An aliphatic polyamide produced from hexamethylenediamine and sebacic acid, manufactured by Showa Denko K. K. under the trade name of Technyl D316.

Nylon 69 (N69)

A 68.3 l capacity autoclave was charged with 25.5 l of water and 945 g of azelaic acid which were subsequently stirred. A 10.5 l portion of 75% hexamethylenediamine aqueous solution was adjusted to pH 7.60 to 7.63 at 80° C. and put into the above autoclave. After 6 hours of reaction at 250° C. in an atmosphere of nitrogen in a closed system, the pressure was released to obtain 13.5 kg of a nylon 69 polymer.
Nylon 6/11 (N6/11)
An autoclave was charged with 5.0 kg of ε-caprolactam, 8.9 kg of 11-aminoundecanoic acid and 1.0 kg of water, the temperature was increased gradually to 260° C. and then the internal pressure was adjusted to 4 kg/cm$^2$ 2 hours thereafter. After 2 hours of reaction at 260° C., generated steam was gradually removed, and the pressure was adjusted to atmospheric pressure and then to a reduced pressure for 1.5 hours of reaction, thereby obtaining a nylon 6/11 polymer.
Nylon 6/12 (N6/12)
An autoclave was charged with 5.0 kg of ε-caprolactam, 9.5 kg of 12-aminododecanoic acid and 1.0 kg of water, the temperature was increased gradually to 260° C. and then the internal pressure was adjusted to 4 kg/cm$^2$ 2 hours thereafter. After 2 hours of reaction at 260° C., generated steam was gradually removed, and the pressure was adjusted to atmospheric pressure and then to a reduced pressure for 1.5 hours of reaction, thereby obtaining a nylon 6/12 polymer.
Nylon 612 (N612)
Equivalent moles of hexamethylenediamine and dodecanedioic acid and water were put into an autoclave, heated at 150° C. under a slightly pressurized condition to concentrate the contents to a salt concentration of about 80% and then heated and concentrated until the internal pressure became 15 to 20 atm. Thereafter, the contents were heated at 250° C. under a pressure of 15 to 20 atm., the steam generated was gradually removed, and the pressure was adjusted to atmospheric pressure and then to a reduced pressure while increasing the internal temperature to 270° to 280° C., thereby obtaining a nylon 612 polymer.
Nylon 11 (N11)
An aliphatic polyamide produced by condensation polymerization of 11-aminoundecanoic acid, manufactured by Toray Industries, Inc. under the trade name of Rilsan BMNO.

Nylon 12 (N12)

An aliphatic polyamide produced by ring-opening polymerization of ω-laurolactam, manufactured by EMS Chemie under a trade name of Grilamid L16.

Nylon 66 (N66)

An aliphatic polyamide produced from hexamethylenediamine and adipic acid, manufactured by ICI under a trade name of Maranyl A226.

AN-1

An autoclave was charged with 2.68 kg of isophthalic acid, 3.89 kg of 4,4'-diamino-3,3'-dimethyldicyclohexylenemethane, 3.76 kg of aminododecanoic acid and 5 kg of water, and 2 hours of polymerization reaction was carried out at 260° C. under an internal pressure of 18 kg/cm². By releasing the pressure, a transparent copolymer nylon (to be referred to as "AN-1" hereinafter) was obtained.

(2) Measuring methods (a) Glass transition point

The heat characteristics of each sample were analyzed by DSC7 manufactured by Perkin Elmer, and the glass transition point of each sample was calculated based on the changes in base lines at the time of temperature increase and decrease. The glass transition points of the polymers used in the Examples and the Comparative Examples are shown in Table 1 below.

(b) Surface tension

The surface tension was calculated using the above-described formula by using "Polymeric Material Design Support System EXPOD" software manufactured by Mitsubishi Research Institute on a work station system "NET WORK STATION NWS-1860 and NEW-OS R3.3" manufactured by SONY CORP.

The surface tensions of polymers used in the Examples and the Comparative Examples are shown in Table 1 below.

(c) Melt viscosity

Using a flow tester (CFT-500, manufactured by Shimadzu Corp.) equipped with a nozzle of 0.5 mm in diameter and 2.0 mm in length, the melt viscosity of each resin sample which has been dried in vacuo at 100° C. for 10 hours was measured at 280° C. with a pre-heating time of 180 seconds by changing the load in 4 points. The apparent melt viscosity (N.sec.m$^{-2}$) at a shear rate of 1,000 sec$^{-1}$ was read from the thus obtained shear rate-melt viscosity curve.

The melt viscosities of the polymers used in the Examples and the Comparative Examples are shown in Table 1 below.

TABLE 1

| Polymer Type | Glass Transition Temperature (°C.) | Melt Viscosity (N sec m$^{-2}$) | Surface Tension (dyne/cm) |
| --- | --- | --- | --- |
| N6 | 50 | 2000 | 45.2 |
| N610 | 46 | 2200 | 39.6 |
| N69 | 46 | 2000 | 40.7 |
| N6/11 | 47 | 1600 | 37.7 |
| N6/12 | 46 | 1500 | 37.7 |
| N612 | 46 | 2400 | 37.7 |
| N11 | 43 | 990 | 34.9 |
| N12 | 41 | 1700 | 33.8 |
| N66 | 50 | 190 | 45.2 |
| AN-1 | 160 | 4000 | 42.6 |

(d) Illuminance anisotropy ratio of transmitted scattered light (IAR)

After melt extrusion, the IAR of a cooled undrawn sheet was measured in the following manner.

In a dark room, a sample of the undrawn sheet was arranged on the stage of a light microscope from which the lens-barrel has been detached, and the illuminance of the transmitted scattered light of the light source in the longitudinal direction of the undrawn sheet ($I_M$) was measured at range 1 using a digital illuminance meter DX-100 (manufactured by Kagaku Kyoei) which was arranged at a distance of 40 mm from the light source and an elevation angle of 30° to the light source. Next, the stage was turned to an angle of 90°, and the illuminance of the transmitted scattered light of the light source in the cross direction of the undrawn sheet ($I_T$) was measured in the same manner to calculate IAR by the following formula.

$$IAR = I_M/I_T$$

The measuring system used to determine illuminance anisotropy ratio of scattered light is shown in FIG. 1.

(e) Tear linearity in the longitudinal direction

Figure 2:
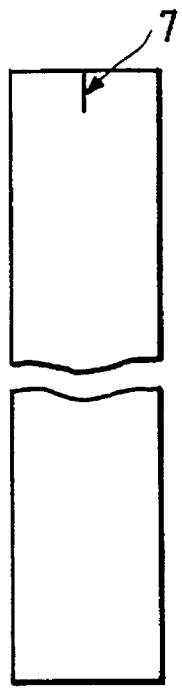
FIG. 2 is a drawing showing the shape of a test piece used in the evaluation of tear linearity of films.
Figure 3A:
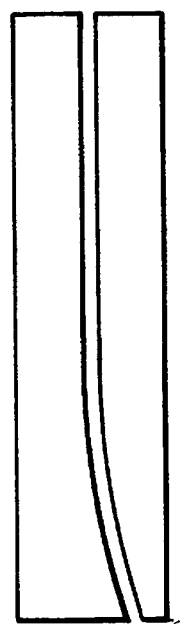
FIG. 3 is a drawing showing the shape of the test piece after its tearing in the tearing test. (a) represents an example of the shape of a test piece having excellent tear linearity after its tearing in the tearing test and (b) represents an example of the shape of a test piece having poor tear linearity after its tearing in the tearing test.
Figure 3B:

A strip film sample of 205 mm in the longitudinal direction and 40 mm in the cross direction was cut from a biaxially oriented film, and a notch of 5 mm in length was made on the central position of one short side of the film sample (see FIG. 2). Each of 10 samples prepared in this manner was torn manually from the notch in its long side direction, and the number of samples in which the tearing end reached the opposite short side as shown in FIG. 3(a) was used as the evaluation value (0 to 10) of the longitudinal direction tear linearity.

This evaluation was carried out on samples prepared from the left end, central portion and right end of each film after drawing and winding.

(f) Haze:

As an index of transparency, the haze of each film of 15 μm in thickness was measured in accordance with the procedure of ASTM D 1003-61. The results of the evaluation were expressed by o when haze≦10%, by Δ when 10%<haze≦20% and by x when haze>20%.

(g) Pin holes after bending

A rectangular film of a size of 20.3 mm×27.9 mm moistened to 65% RH at 20° C. was attached to a Gerbo flex tester (manufactured by Rigaku Kogaku), and a bending test was carried out by bending the film 10,000 times, each bending consisting of 440° rotation during 8.9 mm of linear motion, subsequently 6.4 mm of linear motion and then a return to the original position by reversing these steps.

After the bending test, a coloring solution (Ageless Seal Check, manufactured by Mitsubishi Gas Chemical) was applied to one side of the film, and the number of spots formed by the permeation of the solution on the other side was counted as the number of pinholes (measuring area, 497 mm²).

(h) Coefficient of shrinkage after heating

A rectangular film sample on which bench marks were made in the longitudinal direction (MD) and cross direction (TD) was cut out, treated at 160° C. for 5 minutes in an oven and then the dimension between the bench marks after the treatment was measured under 65% RH at 20° C. The coefficient of shrinkage was expressed as a percentage of the shrunk quantity due to the treatment to the dimension before the treatment.

The formulations (% by weight) of the compositions used in Examples 1 to 17 and Comparative Examples 1 to 7 are shown in Table 2 below.

TABLE 2

| | N6 | N610 | N69 | N6/11 | N6/12 | N612 | N11 | N12 | N66 | AN-1 |
|---|---|---|---|---|---|---|---|---|---|---|
| Examples | | | | | | | | | | |
| 1 | 95 | 5 | | | | | | | | |
| 2 | 80 | 20 | | | | | | | | |
| 3 | 75 | 25 | | | | | | | | |
| 4 | 95 | | 5 | | | | | | | |
| 5 | 95 | | | 5 | | | | | | |
| 6 | 97 | | | | 3 | | | | | |
| 7 | 95 | | | | | 5 | | | | |
| 8 | 95 | | | | | | 5 | | | |
| 9 | 95 | | | | | | | 5 | | |
| 10 | 94 | 3 | | | 3 | | | | | |
| 11 | 93 | | | | 2 | 5 | | | | |
| 12 | 95 | 5 | | | | | | | | |
| 13 | 95 | 5 | | | | | | | | |
| 14 | 95 | 5 | | | | | | | | |
| 15 | 95 | 5 | | | | | | | | |
| 16 | 95 | 5 | | | | | | | | |
| 17 | 95 | 5 | | | | | | | | |
| Comparative Examples | | | | | | | | | | |
| 1 | 100 | | | | | | | | | |
| 2 | 70 | 30 | | | | | | | | |
| 3 | 95 | | | | | | | | 5 | |
| 4 | 95 | | | | | | | | | 5 |
| 5 | 95 | 5 | | | | | | | | |
| 6 | 95 | 5 | | | | | | | | |
| 7 | 95 | 5 | | | | | | | | |

(i) Resin temperature just after T die extrusion (RT)

Using an infrared emission thermometer 505S manufactured by Minolta, the resin temperature was measured from a distance of about 1 m in a right angle direction from a sheet sample with an emissivity of 0.99.

(j) Time until melted polymer extruded in a sheet form from T die is rapidly cooled by its contact with cooling drum (t)

This was calculated from the following formulae of uniformly accelerated linear motion.

$$V^2 - V_0 = 2aS, \quad V = V_0 + at$$

In the above formula, V is the speed after t second (rotation speed of the cooling drum), $V_0$ is the speed of melted polymer just after sheet-like extrusion from a T die (cooling drum rotation speed/DR), a is the acceleration, S is the distance until the melted sheet extruded from T die reached the cooling drum, and t is the time until the melted sheet extruded from T die reached the cooling drum.

(k) Shear rate of T die lip-passing polymer ($D_w$)

This was calculated from the following formula.

$$D_w = (6Q)/(Wd^2)$$

In this formula, Q is the discharge, W is the T die width and d is the T die lip opening.

EXAMPLE 1

A composition in which N6 and N610 were mixed at a weight ratio of 95:5 was prepared ($\gamma_A - \gamma_B = 5.6$, PR=1.1).

This composition was melt-extruded at a resin temperature of 280° C. using a 100 mm Φ extruder equipped with a coat hanger type T die and rapidly cooled by contacting it with a cooling drum at a temperature of 20° C., thereby obtaining an undrawn sheet of about 150 μm in thickness.

In this case, the slit space of the T die was about 1.3 mm, and V=21 m/min, S=0.10 m, $D_w$=141 sec$^{-1}$, t=0.51 second, DR=8.7 and IAR=0.6.

The thus obtained undrawn sheet was transferred into a hot water bath at 50° C. and soaked for 2 minutes to adjust the water content of the sheet to 4.9%. Tip parts of this sheet were fixed with clips of a tenter type simultaneous biaxial drawing machine and drawn 3.0 times in the lengthwise direction and 3.3 times in the crosswise direction at a temperature of 175° C. Thereafter, the thus drawn sheet was treated at 210° C. for 4 seconds in a crosswise direction relaxation of 5% and then gradually cooled to room temperature (about 20°–30° C.) to obtain a biaxially oriented film having a thickness of 15 μm.

The tear linearity and bending pinhole resistance of the biaxially oriented film were measured, with the results obtained shown in Table 3. As shown in Table 3, the thus obtained film showed a bending pinhole resistance and a transparency which were similar to those of the biaxially oriented film of N6 and excellent dimensional stability after heating and tear linearity in the longitudinal direction of the film.

EXAMPLES 2 AND 3

Biaxially oriented films were produced in the same manner as described in Example 1, except that the mixing weight ratio of N610 was changed as shown in Table 2.

As shown in Table 3, each of the thus obtained films showed excellent bending pin hole resistance, transparency, dimensional stability after heating and tear linearity in the longitudinal direction of the film.

EXAMPLES 4 to 11

Biaxially oriented films were produced in the same manner as described in Example 1, except that N69, N6/11, N6/12, N612, N11 or N12 was used instead of N610, in the respective mixing ratios shown in Table 2.

As shown in Table 3, each of the thus obtained films showed excellent bending pin hole resistance, transparency, dimensional stability after heating and tear linearity in the longitudinal direction of the film.

TABLE 3

(EXAMPLES)

| | Δγ | PR | IAR | S | PT | $D_W$ | t | E* | TL* | HS* | P* | H* |
|---|---|---|---|---|---|---|---|---|---|---|---|---|
| 1 | 5.6 | 1.1 | 0.6 | 0.10 | 260 | 141 | 0.51 | L | 10 | 2.0/0.5 | 4 | o |
| | | | | | | | | C | 10 | | | |
| | | | | | | | | R | 10 | | | |
| 2 | 5.6 | 1.1 | 0.5 | 0.10 | 260 | 141 | 0.51 | L | 10 | 1.9/0.8 | 5 | o |
| | | | | | | | | C | 10 | | | |
| | | | | | | | | R | 10 | | | |
| 3 | 5.6 | 1.1 | 0.5 | 0.10 | 260 | 141 | 0.51 | L | 10 | 1.7/1.1 | 6 | o |
| | | | | | | | | C | 10 | | | |
| | | | | | | | | R | 10 | | | |
| 4 | 4.5 | 1.0 | 0.6 | 0.10 | 260 | 141 | 0.51 | L | 10 | 2.0/0.4 | 3 | o |
| | | | | | | | | C | 10 | | | |
| | | | | | | | | R | 10 | | | |
| 5 | 7.5 | 0.8 | 0.5 | 0.10 | 260 | 141 | 0.51 | L | 10 | 2.0/0.3 | 3 | o |
| | | | | | | | | C | 10 | | | |
| | | | | | | | | R | 10 | | | |
| 6 | 7.5 | 0.8 | 0.5 | 0.10 | 260 | 141 | 0.51 | L | 8 | 1.9/0.9 | 3 | o |
| | | | | | | | | C | 9 | | | |
| | | | | | | | | R | 8 | | | |
| 7 | 7.5 | 1.2 | 0.5 | 0.10 | 260 | 141 | 0.51 | L | 10 | 1.5/1.1 | 4 | o |
| | | | | | | | | C | 10 | | | |
| | | | | | | | | R | 10 | | | |
| 8 | 10.3 | 0.5 | 0.5 | 0.10 | 260 | 141 | 0.51 | L | 10 | 1.9/1.1 | 3 | o |
| | | | | | | | | C | 10 | | | |
| | | | | | | | | R | 10 | | | |
| 9 | 11.4 | 0.9 | 0.5 | 0.10 | 260 | 141 | 0.51 | L | 10 | 1.2/0.9 | 3 | o |
| | | | | | | | | C | 10 | | | |
| | | | | | | | | R | 10 | | | |
| 10 | 6.6 | 1.0 | 0.6 | 0.10 | 260 | 141 | 0.51 | L | 10 | 1.8/0.5 | 3 | o |
| | | | | | | | | C | 10 | | | |
| | | | | | | | | R | 10 | | | |
| 11 | 7.5 | 1.1 | 0.6 | 0.10 | 260 | 141 | 0.51 | L | 10 | 1.8/0.4 | 3 | o |
| | | | | | | | | C | 10 | | | |
| | | | | | | | | R | 10 | | | |

*E, evaluated positions (L, left tip; C, center. R, right tip);
*TL, tear linearity;
*HS, coefficient of shrinkage after heating (lengthwise/crosswise);
*P, number of pinholes and
*H, haze.

EXAMPLE 12

A biaxially oriented film was produced in the same manner as described in Example 1 except that S and t were changed to 0.09 m and 0.44 second, respectively, and the tear linearity and bending pinhole resistance of the film were measured.

As shown in Table 4, the thus obtained film had excellent bending pinhole resistance, transparency, dimensional stability after heating and tear linearity in the longitudinal direction of the film.

EXAMPLE 13

A biaxially oriented film was produced in the same manner as described in Example 12 except that the draw ratio was changed to 5.0 in the lengthwise direction and 3.3 in the crosswise direction, and the tear linearity and bending pinhole resistance of the film were measured.

As shown in Table 4, the thus obtained film had excellent bending pinhole resistance, transparency, dimensional stability after heating and tear linearity in the longitudinal direction of the film.

EXAMPLES 14 to 16

Biaxially oriented films were produced in the same manner as described in Example 1 except that S, PT, $D_W$ and t were changed to the respective values as shown in Table 4, and the tear linearity and bending pinhole resistance were measured.

As shown in Table 4, the thus obtained film had excellent bending pinhole resistance, transparency, dimensional stability after heating and tear linearity in the longitudinal direction of the film.

EXAMPLE 17

A biaxially oriented film was produced in the same manner as described in Example 1 except that a 200 mm Φ extruder was used, V was changed to 38 m/min and S, $D_W$ and t were changed to respective values shown in Table 4, and the tear linearity and bending pinhole resistance of the film were measured.

As shown in Table 4, the thus obtained film had excellent bending pinhole resistance, transparency, dimensional stability after heating and tear linearity in the longitudinal direction of the film.

TABLE 4

(EXAMPLES)

| | Δγ | PR | IAR | S | PT | $D_W$ | t | E* | TL* | HS* | P* | H* |
|---|---|---|---|---|---|---|---|---|---|---|---|---|
| 12 | 5.6 | 1.1 | 0.8 | 0.09 | 260 | 141 | 0.44 | L | 10 | 2.0/0.4 | 3 | o |
| | | | | | | | | C | 10 | | | |
| | | | | | | | | R | 10 | | | |
| 13 | 5.6 | 1.1 | 0.5 | 0.09 | 260 | 141 | 0.44 | L | 10 | 1.8/0.8 | 4 | o |
| | | | | | | | | C | 10 | | | |
| | | | | | | | | R | 10 | | | |
| 14 | 5.6 | 1.1 | 0.6 | 0.21 | 240 | 141 | 1.1 | L | 10 | 1.9/1.1 | 4 | o |
| | | | | | | | | C | 10 | | | |
| | | | | | | | | R | 10 | | | |
| 15 | 5.6 | 1.1 | 0.6 | 0.16 | 250 | 141 | 0.8 | L | 10 | 1.6/0.9 | 4 | o |
| | | | | | | | | C | 10 | | | |
| | | | | | | | | R | 10 | | | |
| 16 | 5.6 | 1.1 | 0.6 | 0.04 | 270 | 141 | 0.2 | L | 10 | 1.5/0.8 | 4 | o |
| | | | | | | | | C | 10 | | | |
| | | | | | | | | R | 10 | | | |
| 17 | 5.6 | 1.1 | 0.7 | 0.18 | 260 | 263 | 0.51 | L | 9 | 1.4/0.9 | 4 | o |
| | | | | | | | | C | 9 | | | |
| | | | | | | | | R | 9 | | | |

*E, evaluated positions (L, left tip; C, center. R, right tip);
*TL, tear linearity;
*HS, coefficient of shrinkage after heating (lengthwise/crosswise);
*P, number of pinholes; and
*H, haze.

COMPARATIVE EXAMPLES 1 AND 2

Biaxially oriented films were produced in the same manner as described in Example 1, except that the blending ratio of N610 was changed to the respective values shown in Table 2.

As shown in Table 5, the N6 film of Comparative Example 1 had no tear linearity, and the film of Comparative Example 2 showed excellent tear linearity but with poor transparency and extremely inferior bending pinhole resistance.

COMPARATIVE EXAMPLE 3

A biaxially oriented film was produced in the same manner as described in Example 1, except that N66 was used instead of N610 in a weight ratio shown in Table 2.

As shown in Table 5, the thus obtained film showed no tear linearity.

COMPARATIVE EXAMPLE 4

A biaxially oriented film was produced in the same manner as described in Example 1, except that AN-1 was used instead of N610 in a weight ratio shown in Table 2.

As shown in Table 5, the thus obtained film showed no tear linearity.

COMPARATIVE EXAMPLES 5 TO 7

Biaxially oriented films were produced in the same manner as described in Example 1, except that S, PT and t were changed to the respective values shown in Table 5, and their tear linearity and bending pinhole resistance were measured.

As shown in Table 5, the thus obtained films showed no tear linearity.

TABLE 5

(COMPARATIVE EXAMPLES)

| | Δγ | PR | IAR | S | PT | $D_W$ | t | E* | TL* | HS* | P* | H* |
|---|---|---|---|---|---|---|---|---|---|---|---|---|
| 1 | — | — | 1.0 | 0.10 | 260 | 141 | 0.51 | L | 3 | 1.5/0.5 | 2 | o |
| | | | | | | | | C | 3 | | | |
| | | | | | | | | R | 0 | | | |
| 2 | 5.6 | 1.1 | 0.3 | 0.10 | 260 | 141 | 0.51 | L | 10 | 2.5/2.0 | 19 | x |
| | | | | | | | | C | 10 | | | |
| | | | | | | | | R | 10 | | | |
| 3 | 0 | 0.09 | 1.0 | 0.10 | 260 | 141 | 0.51 | L | 2 | 2.2/1.9 | 4 | o |
| | | | | | | | | C | 4 | | | |
| | | | | | | | | R | 2 | | | |
| 4 | 2.6 | 2.0 | 1.0 | 0.10 | 260 | 141 | 0.51 | L | 1 | 3.3/2.5 | 3 | o |
| | | | | | | | | C | 2 | | | |
| | | | | | | | | R | 1 | | | |
| 5 | 5.6 | 1.1 | 0.9 | 0.29 | 240 | 141 | 1.5 | L | 1 | 2.0/0.9 | 3 | o |
| | | | | | | | | C | 2 | | | |

TABLE 5-continued

| | (COMPARATIVE EXAMPLES) | | | | | | | | | | | |
|---|---|---|---|---|---|---|---|---|---|---|---|---|
| | Δγ | PR | IAR | S | PT | $D_W$ | t | E* | | TL* | HS* | P* | H* |
| 6 | 5.6 | 1.1 | 0.9 | 0.21 | 250 | 141 | 1.1 | R | 1 | | 1.8/1.0 | 3 | o |
| | | | | | | | | L | 2 | | | | |
| | | | | | | | | C | 2 | | | | |
| 7 | 5.6 | 1.1 | 0.9 | 0.10 | 270 | 141 | 0.50 | R | 2 | | 1.7/0.8 | 3 | o |
| | | | | | | | | L | 2 | | | | |
| | | | | | | | | C | 2 | | | | |
| | | | | | | | | R | 2 | | | | |

*E, evaluated positions (L, left tip; C, center. R, right tip);
*TL, tear linearity;
*HS, coefficient of shrinkage after heating (lengthwise/crosswise);
*P, number of pinholes; and
*H, haze.

EXAMPLES 18 TO 25 AND COMPARATIVE EXAMPLES 8 TO 13

Multilayer films with the packaging material structure shown in Table 6 were prepared by a dry laminate process and their bending pinhole resistances were evaluated. Next, each of these multilayer films was made into a square seal bag of 200 mm in longitudinal and cross directions in such a manner that the longitudinal direction of the film of the present invention was arranged in the tearing direction of the bag.

The packaging material constituents are abbreviated as follows.

ON1: biaxially oriented film obtained in Example 1
ON6: biaxially oriented film obtained in Example 6
ON(1): biaxially oriented film obtained in Comparative Example 1
ON(2): biaxially oriented film obtained in Comparative Example 2
LLDPE: linear low density polyethylene (TUX-TC manufactured by Tokyo Serofan Paper, 60 µm in thickness)
PET: polyethylene terephthalate film (manufactured by Unitika Ltd., 12 µm in thickness)
CPP: non-oriented polypropylene film (manufactured by Toray Industries, Inc., 60 µm in thickness)
AL: aluminium foil (manufactured by Showa Aluminium, 7 µm in thickness)

Table 6 shows results of the evaluation of bending pinhole resistance and tear linearity.

TABLE 6

| | Constitution of Packaging Material | Tear Linearity | Pinholes Generated |
|---|---|---|---|
| Examples | | | |
| 18 | ON1/LLDPE | good | 7 |
| 19 | PET/ON1/LLDPE | good | 8 |
| 20 | ON1/AL/CPP | good | — |
| 21 | PET/ON1/AL/CP | good | — |
| 22 | ON1/LLDPE | good | 4 |
| 23 | PET/ON6/LLDPE | good | 4 |
| 24 | ON6/AL/CPP | good | — |
| 25 | PET/ON6/AL/CPP | good | — |
| Comparative Example | | | |
| 8 | ON(1)/LLDPE | bad | 3 |
| 9 | PET/ON(1)/LLDPE | bad | 1 |
| 10 | ON(1)/AL/CPP | bad | — |

TABLE 6-continued

| | Constitution of Packaging Material | Tear Linearity | Pinholes Generated |
|---|---|---|---|
| 11 | PET/ON(1)/AL/CPP | bad | — |
| 12 | ON(2)/LLDPE | good | 32 |
| 13 | PET/ON(2)/LLDPE | good | 23 |

Thus, it is apparent that, in accordance with the present invention, a biaxially oriented polyamide film which has excellent toughness and bending pinhole resistance and has a tear linearity in the longitudinal direction of the film has been produced. In addition, packing bags having excellent unsealability can be obtained when the film of the present invention is used in one or more film layers which constitute the bag.

While the invention has been described in detail and with reference to specific examples thereof, it will be apparent to one skilled in the art that various changes and modifications can be made therein without departing from the spirit and scope thereof.

What is claimed is:

1. A biaxially oriented polyamide film having a tear linearity in the longitudinal direction of the film, which comprises as a main material nylon 6 and an aliphatic polyamide resin other than nylon 6 mixed in a weight ratio of from 75:25 to 99:1, wherein the difference in surface tension (dyne/cm) between N6 and PA satisfies the following relationship (1)

$$3.0 \leq \gamma_A - \gamma_B \leq 15.0 \qquad (1)$$

wherein $\gamma_A$ is the surface tension of N6 and $\gamma_B$ is the surface tension of PA, and wherein particles of PA are uniformly dispersed in a matrix of N6.

2. The biaxially oriented polyamide film according to claim 1, which is obtained by drawing an undrawn sheet, wherein said undrawn sheet has as illuminance anisotropy of transmitted scattered light of 0.1 to 0.8.

3. The biaxially oriented polyamide film according to claim 1 or 2, wherein said film has a haze value of 10% or less and a shrinkage coefficient of 5% or less when treated at 160° C. for 5 minutes.

4. The biaxially oriented polyamide film according to claim 1 or 2, wherein said PA is a polyamide resin which contains 90 mol % or more of at least one resin selected from the group consisting of nylon 11, nylon 12, nylon 69, nylon 610 and nylon 612.

5. The biaxially oriented polyamide film according to claim 3, wherein said PA is a polyamide resin which contains 90 mol % or more of at least one resin selected from the group consisting of nylon 11, nylon 12, nylon 69, nylon 610 and nylon 612.

6. The biaxially oriented polyamide film according to claim 1 or 2, wherein said PA is a polyamide resin which contains 90 mol % or more of at least one of nylon 6/12 and nylon 6/11 having a copolymerization molar ratio of from 10:90 to 90:10.

7. The biaxially oriented polyamide film according to claim 3, wherein said PA is a polyamide resin which contains 90 mol % or more of at least one of nylon 6/12 and nylon 6/11 having a copolymerization molar ratio of from 10:90 to 90:10.

8. A multilayer film comprising at least one layer of the biaxially oriented polyamide film according to claim 1 or 2.

9. A multilayer film comprising at least one layer of the biaxially oriented polyamide film according to claim 3.

10. An easily unsealable packing bag obtained by bag-making the multilayer film of claim 8.

11. An easily unsealable packing bag obtained by bag-making the multilayer film of claim 9.

12. A process for producing a biaxially oriented polyamide film, which comprises:

(1) extruding a mixture of nylon 6 and an aliphatic polyamide resin other than nylon 6 in a weight ratio of from 75:25 to 99:1 in the shape of a sheet through a lip opening of a die, wherein particles of PA are uniformly dispersed in a matrix of N6, and wherein the shear rate of the melted polymers is kept at 100 to 400 $\sec^{-1}$ and the relationship between the temperature of the melted polymers (PT) extruded from the lip opening of the die and the time (t) until the melted polymers reach a cooling drum is controlled under any one of the following conditions (a) to (e)

(a) $t \leq 1.2$ seconds when PT is within $240 \leq PT < 250°$ C.,
(b) $t \leq 0.9$ seconds when PT is within $250 \leq PT < 260°$ C.,
(c) $t \leq 0.6$ seconds when PT is within $260 \leq PT < 270°$ C.,
(d) $t \leq 0.3$ seconds when PT is within $270 \leq PT < 280°$ C., and
(e) $t \leq 0.1$ seconds when PT is within $280 \leq PT < 290°$ C., (2) adjusting the water content of the resulting undrawn sheet to 1 to 6% by weight, and (3) drawing the sheet at a temperature of 150 to 220° C. with a draw ratio of 2.5 or more in both the lengthwise and crosswise directions.

13. The biaxially oriented polyamide film according to claim 1, wherein the melt viscosity of PA is 0.1 to 4.0 times higher than that of N6 and the glass transition point of PA is lower than the crystallization temperature of N6.

14. The biaxially oriented polyamide film according to claim 1, wherein the melt viscosity of PA is 0.2 to 2.0 times higher than that of N6 and the glass transition point of PA is 20° C. or more lower than the crystallization temperature of N6.

15. The biaxially oriented polyamide film according to claim 1, wherein the melt viscosity of PA is 0.2 to 2.0 times higher than that of N6 and the glass transition point of PA is 30° C. or more lower than the crystallization temperature of N6.

16. The biaxially oriented polyamide film according to claim 1, wherein said nylon 6 and said aliphatic polyamide resin other than nylon 6 are mixed in a weight ratio of from 90:10 to 97:3.

17. The biaxially oriented polyamide film according to claim 1, wherein said aliphatic polyamide resin is a homopolymer.

* * * * *